(12) United States Patent
Liao et al.

(10) Patent No.: US 10,341,394 B2
(45) Date of Patent: *Jul. 2, 2019

(54) METHOD AND SYSTEM FOR CALL SETUP

(71) Applicant: MEDIATEK INC., Hsin-Chu (TW)

(72) Inventors: Shih-Chieh Liao, Kaohsiung (TW); Chi-Chen Lee, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/996,720

(22) Filed: Jun. 4, 2018

(65) Prior Publication Data

US 2018/0278659 A1    Sep. 27, 2018

Related U.S. Application Data

(63) Continuation-in-part of application No. 15/355,429, filed on Nov. 18, 2016, now Pat. No. 10,028,243.

(60) Provisional application No. 62/257,758, filed on Nov. 20, 2015.

(51) Int. Cl.
*H04L 29/06* (2006.01)
*H04W 36/00* (2009.01)
*H04W 76/27* (2018.01)

(52) U.S. Cl.
CPC ...... *H04L 65/1069* (2013.01); *H04L 65/1006* (2013.01); *H04L 65/1016* (2013.01); *H04W 36/0022* (2013.01); *H04W 76/27* (2018.02)

(58) Field of Classification Search
CPC ............ H04L 65/1006; H04L 65/1016; H04L 65/1069; H04W 36/0022; H04W 76/27
See application file for complete search history.

(56) References Cited

U.S. PATENT DOCUMENTS

| 2010/0172289 A1* | 7/2010 | Holma | H04W 36/28 370/328 |
| 2014/0087723 A1* | 3/2014 | Cili | H04W 24/08 455/426.1 |
| 2015/0003411 A1 | 1/2015 | Sandhu et al. | |
| 2015/0382221 A1 | 12/2015 | Dalsgaard | |
| 2016/0353330 A1 | 12/2016 | Naik | |
| 2017/0034757 A1 | 2/2017 | Yang | |

* cited by examiner

*Primary Examiner* — Wayne H Cai
(74) *Attorney, Agent, or Firm* — Oblon, McClelland, Maier & Neustadt, L.L.P.

(57) ABSTRACT

Aspects of the disclosure provide a method for setting up a call for a user equipment. The method includes receiving, by the user equipment, a measurement configuration message that specifies a set of measurement events corresponding to poor signal quality between the user equipment and a packet-switched network, and sending, by the user equipment, a measurement report when one of the set of measurement events occurs while performing a first call setup process for setting up the call using the packet-switched network. The method also includes terminating the first call setup process after sending the measurement report that indicates poor signal quality between the user equipment and the packet-switched network, and sending, by the user equipment, a service request to begin a second call setup process for setting up the call for the user equipment using a circuit-switched network after terminating the first call setup process.

20 Claims, 4 Drawing Sheets

METHOD AND SYSTEM FOR CALL SETUP

INCORPORATION BY REFERENCE

This application is a continuation of U.S. application Ser. No. 15/355,429, filed Nov. 18, 2016 which claims the benefit of U.S. Provisional Application No. 62/257,758, "Signal based alerting CSFB or pre-alerting CSFB during IMS call setup (eVoLTE)" filed on Nov. 20, 2015. The contents of the above-noted applications are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many communication standards have been developed to meet the demands for mobile communications. Example communication standards include Global System for Mobile communications (GSM), General Packet Radio Service (GPRS) technology, Enhanced Data rates for Global Evolution (EDGE) technology, Universal Mobile Telecommunications System (UMTS), Worldwide Interoperability for Microwave Access (WiMAX) technology, and Long Term Evolution (LTE) technology, and the like. When setting up a voice call for a mobile terminal (or sometimes also referred to as a user equipment or UE), some communication standards rely upon circuit-switched networks, and some communication standards rely upon packet-switched networks. A service provider may implement a service network that offers setting up a voice call for a mobile terminal using either a circuit-switched network or a packet-switched network. While setting up a voice call, the service network may first attempt to use the packet-switched network, and may use the circuit-switched network instead when the signal quality between the mobile terminal and the packet-switched network is poor. In some applications according to the LTE standards, changing from the packet-switched network to the circuit-switched network when setting up a call is also known as the Circuit Switched Fallback (CSFB) functionality in the 3rd Generation Partnership Project Technical Specification (3GPP TS) 23.272.

SUMMARY

Aspects of the disclosure provide a method for setting up a call for a user equipment. The method includes receiving, by the user equipment, a measurement configuration message that specifies a set of measurement events corresponding to poor signal quality between the user equipment and a packet-switched network, and sending, by the user equipment, a measurement report when one of the set of measurement events occurs while performing a first call setup process for setting up the call using the packet-switched network. The method also includes terminating the first call setup process after sending the measurement report that indicates poor signal quality between the user equipment and the packet-switched network, and sending, by the user equipment, a service request to begin a second call setup process for setting up the call for the user equipment using a circuit-switched network after terminating the first call setup process.

In an embodiment, the set of measurement events may include a first event where a signal strength from a base station that communicatively connects the user equipment and the packet-switched network becomes less than a first threshold, a second event where a signal strength from a neighboring base station becomes better than a second threshold, or a third event that is a combination of at least the first event and the second event.

The method may further include initiating the first call setup process by the user equipment, receiving a termination message after sending the measurement report, and sending the service request in response to receiving the termination message. The termination message may indicate termination of the first call setup process without requesting the user equipment to perform retry attempts.

In an embodiment, the method may further include initiating the first call setup process by the user equipment, starting a timeout timer when sending the measurement report, and sending the service request after the timeout timer reaches a predetermined value.

The method can also include initiating the first call setup process by the user equipment, starting a timeout timer when sending the measurement report, and receiving a termination message after sending the measurement report. The method may include sending the service request in response to an earlier one of receiving the termination message and the timeout timer reaching a predetermined value.

Also, the method may further include receiving, by the user equipment, an invite message that indicates initiation of the first call setup process, receiving a cancellation message after sending the measurement report, and receiving a service notification message after receiving the cancellation message. The method may include sending the service request in response to receiving the service notification message. The cancellation message may indicate termination of the first call setup process, and the service notification message may indicate initiation of the second call setup process.

In some embodiments, the method also includes sending, by a base station that communicatively connects the user equipment and the packet-switched network, the measurement configuration message to the user equipment, receiving, by the base station, the measurement report from the user equipment, and determining whether to terminate the first call setup process and to begin the second call setup process based on at least the measurement report from the user equipment.

Additionally, the method may include receiving, by the base station, a create bearer request from an Internet Protocol Multimedia Subsystem (IMS), and sending, by the base station to the IMS in response to the create bearer request, a create bearer response that indicates a determination result of whether to terminate the first call setup process and to begin the second call setup process.

Aspects of the disclosure further provide a user equipment that includes a transceiver and a controller. The transceiver may be configured to communicate with a packet-switched network and a circuit-switched network. The controller may be configured to receive, through the transceiver, a measurement configuration message that specifies a set of measurement events corresponding to poor signal quality between the user equipment and a packet-switched network, send, through the transceiver, a measurement report when one of the set of measurement events occurs while performing a first call setup process for setting up a call for the user equipment using the packet-switched network, terminate the first call setup process after sending the measurement report that indicates poor signal quality between the user equipment and the packet-switched network, and send, through the transceiver, a service request to begin a second call setup process for setting up the call for the user equipment using the circuit-switched network after terminating the first call setup process.

In an embodiment, the set of measurement events may include a first event where a signal strength from a base station that communicatively connects the user equipment and the packet-switched network becomes less than a first threshold, a second event where a signal strength from a neighboring base station becomes better than a second threshold, or a third event that is a combination of at least the first event and the second event.

Also, the user equipment may be configured to initiate the first call setup process or receive an invite message that indicates initiation of the first call setup process.

Aspects of the disclosure further provide a communication system that includes a service network and a user equipment configured to communicate with the service network. The service network may send a measurement configuration message that specifies a set of measurement events corresponding to poor signal quality between the user equipment and a packet-switched network of the service network. The user equipment may receive the measurement configuration message, send a measurement report when one of the set of measurement events occurs while performing the first call set-up process, terminate the first call setup process after sending the measurement report that indicates poor signal quality between the user equipment and the packet-switched network, and send a service request to begin a second call setup process for setting up the call for the user equipment using a circuit-switched network after terminating the first call setup process.

In an embodiment, the service network may include an Internet Protocol Multimedia Subsystem (IMS) and a base station. The base station can receive a create bearer request from the IMS, and send a create bearer response that indicates a determination result of whether to terminate the first call setup process and to begin the second call setup process to the IMS in response to the create bearer request.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

A person having ordinary skill in the art would appreciate that various components and communication interfaces described in the present disclosure are well known in the pertinent technology fields, as provided in the corresponding 3GPP technical specifications that corresponds to the GSM, EDGE, GPRS, UMTS, and/or LTE standards. However, it should be understood that the disclosed embodiments are not limited to the applications in the context of the GSM, EDGE, GPRS, UMTS, and/or LTE standards as defined by the 3GPP.

In some applications, the CSFB functionality may be implemented by LTE Single Radio Voice Call Continuity (SRVCC) if the service provider has configured the service network to support such features. In accordance with the present disclosure, the CSFB functionality may be implemented by using signaling messages, requests, or responses that have been implemented in the service network even when the service network is not configured to offer the SRVCC feature.

Figure 1:
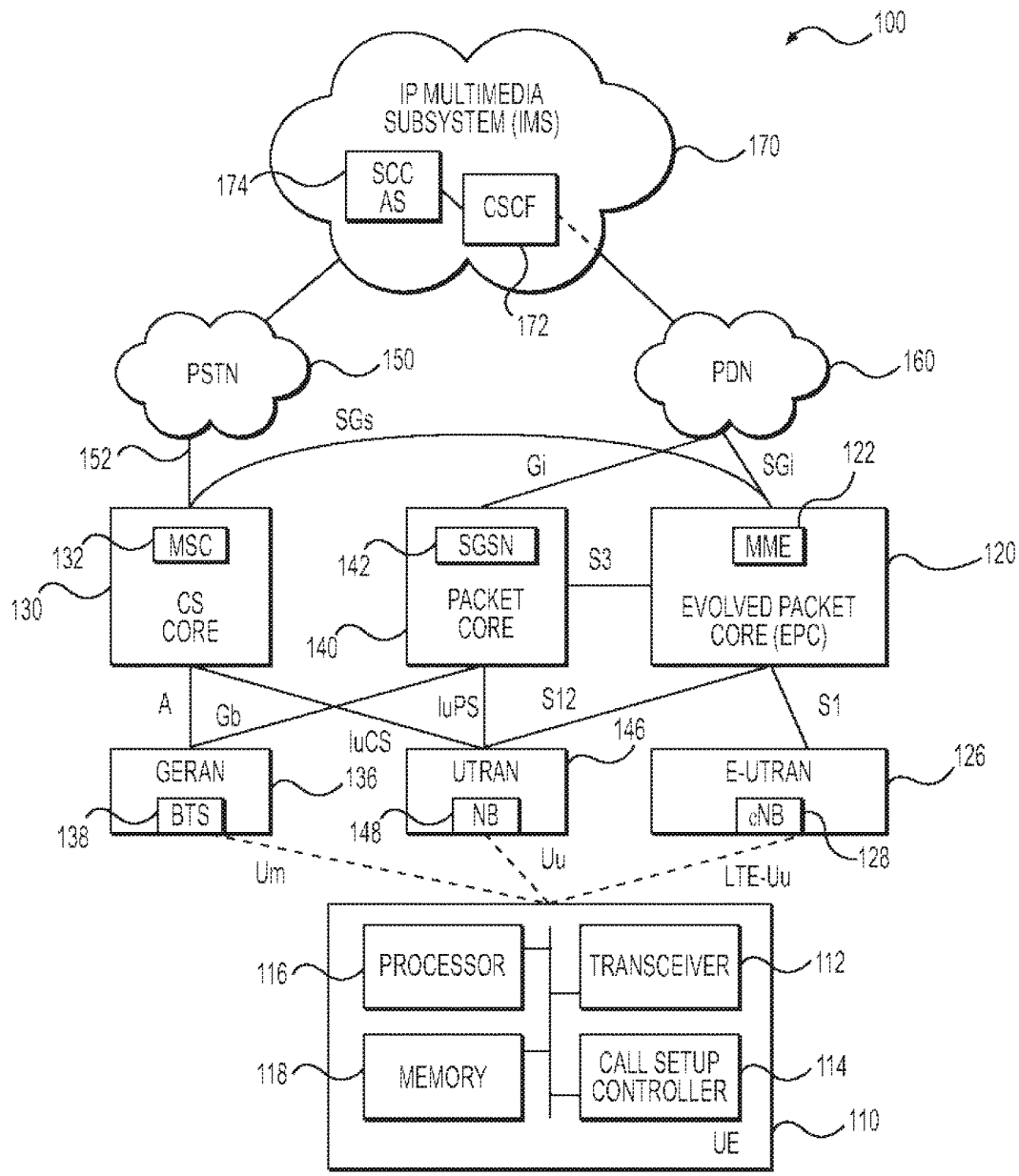
FIG. 1 shows an exemplary block diagram of a communication system for illustrating setting up a call for a user equipment, including changing from using a packet-switched network to a circuit-switched network, according to an embodiment of the disclosure.

FIG. 1 shows an exemplary block diagram of a communication system 100 for illustrating setting up a call for a user equipment (UE) 110, including changing from using a packet-switched network to a circuit-switched network, such as from a Evolved Packet Core (EPC) network 120 to a Circuit Switched (CS) core network 130, according to an embodiment of the disclosure.

The communication system 100 includes the UE 110, the EPC network 120, the CS core network 130, a package core network 140, an Evolved Universal Terrestrial Radio Access Network (E-UTRAN) 126, a GSM EDGE Radio Access Network (GERAN) 136, and a Universal Terrestrial Radio Access Network (UTRAN) 146. The communication system 100 may further include a public switched telephone network (PSTN) 150, a packet data network (PDN) 160, and an IP multimedia subsystem (IMS) 170. The configurations and communication interfaces as depicted in FIG. 1 may be compatible with the GSM, EDGE, GPRS, UMTS, and/or LTE standards as defined by the 3GPP.

The EPC network 120 may, for example, be implemented based on the LTE standard and may include a Mobility Management Entity (MME) 122 as a main controller thereof. The EPC network 120 can communicate with the E-UTRAN 126 using an S1 interface and with the PDN 160 using at least an SGi interface. The E-UTRAN 126 may be implemented based on the LTE standard and may include an Evolved Node B (eNB) 128 that can function as a base station and communicate with the UE 110 using a LTE-Uu interface.

The CS core network 130 may be implemented based on the GSM/EDGE/GPRS standards and may include a Mobile Switching Center (MSC) 132 as a main controller thereof. The CS core network 130 can communicate with the GERAN 136 using an A interface, with the UTRAN 146 using an IuCS Interface, and with the PSTN 150 through dedicated signal paths 152. The GERAN 136 may be implemented based on the GSM/EDGE/GPRS standards and may include a Base Transceiver Station (BTS) 138 that can function as a base station and communicate with the UE 110 using an Um interface.

The packet core network 140 may be implemented based on the GPRS and/or UMTS standards and may include a Serving GPRS Support Node (SGSN) 142 as a main controller thereof. The packet core network 140 can communicate with the UTRAN 146 using an IuPS interface, with the GERAN 136 using a Gb interface, and with the PDN 160 using a Gi interface. The UTRAN 146 may be implemented based on the UMTS standard and may include a Node B (NB) 148 that can function as a base station and communicate with the UE 110 using a Uu interface. The EPC 120 and the packet core 140 may communicate with each other using at least an S3 interface. The EPC 120 and the CS core network 130 may communicate with each other using at least an SGs interface.

Further, the IMS 170 can be implemented based on the LTE standard and communicatively coupled with the PDN 160 and the PSTN 150. The IMS 170 may include a Call Session Control Function (CSCF) controller 172 and a Service Centralization and Continuity Application Server (SCC AS) 174. The MME 122 of the EPC 120 and the SGSN 142 of the packet core network (140) can be communicatively coupled with the IMS 170 via the PDN 160.

In the present disclosure, the combination of one or more of the EPC 120, E-UTRAN 126, CS Core network 130, GERAN 136, Packet Core network 140, UTRAN 146, PSTN 150, PDN 160, and IMS 170 may also be referred to as a service network.

In operation, the eNB 128 may send to the UE 110 a measurement configuration message that specifies a set of measurement events corresponding to poor signal quality between the UE 110 and a packet-switched network, such as the EPC 120, and particularly between the UE 110 and the eNB 128 that connects the UE 110 with the EPC 120. While performing a call setup process for setting up a call for the UE 110 using the EPC 120, the UE 110 may monitor the signal quality and send a measurement report to the eNB 128 when one of the set of measurement events as specified in the measurement configuration message occurs. The eNB 128 may determine, based on at least the measurement report from the UE 110, whether to terminate the call setup process for setting up the call using the EPC 120 and to initiate another call setup process for setting up the call using the circuit-switched network, such as the CS Core network 130 EPC. The eNB 128 may receive a create bearer request from the CSCF controller 172 of the IMS 170 and send in response to the create bearer request a create bearer response that indicates a determination result of whether to terminate the first call setup process and to begin the second call setup process to the CSCF controller 172. The UE 110 may terminate the call setup process that uses the EPC 120 after sending the measurement report and then send a service request to the MSC 132 of the CS Core network 130 to begin another call setup process for setting up the call using the CS Core network 130.

In some examples, in addition to the measurement report from the UE 110, the eNB 128 may further consider whether the current call setup process has been completed successfully, the current status of the call setup process, whether a Session Initiation Protocol (SIP) 180 Ringing Response has been received, or whether the service network supports the SRVCC feature, and the like. Also, the create bearer request and the create bearer response may be an LTE Create Bearer Request and an LTE Create Bearer Response as defined in the LTE standards.

The eNB 128 may send the measurement configuration message before or during the call setup process for setting up a call for the UE 110 using the EPC 120. The set of measurement events may include a first event where a signal strength from a base station that connects the UE 110 and the EPC 120 becomes less than a first threshold, a second event where a signal strength from a neighboring base station becomes better than a second threshold, and/or a third event that is a combination of at least the first event and the second event. In some examples, the set of measurement events may include the LTE A1, B1, and/or B2 measurement events. Also, the measurement configuration message may be implemented using a LTE radio resource control (RRC) connection reconfiguration message.

In one example, the UE 110 is an originating terminal that makes an outgoing voice call. The UE 110 initiates a first call setup process that attempts to set up a voice call for the UE 110 using the EPC 120 by sending a request to the CSCF controller 172 and the SCC AS 174 of the IMS 170. The request for initiating the call may be an SIP INVITE Request. The UE 110 may receive the measurement configuration message from the eNB 128 before or after the initiation of the first call setup process. While performing the first call setup process, when one of the set of measurement events specified by the measurement configuration message occurs, the UE 110 may send a measurement report that reports the occurrence of such measurement event, which indicates that the signal quality between the UE 110 and the eNB 128 may not be good enough for successfully setting up a call using the EPC 120.

After sending the measurement report, the UE 110 may wait for a termination message from the CSCF controller 172 of the IMS 170 that informs termination of the first call setup process. The UE 110 then may send the service request to initiate the second call setup process for setting up the voice call for the UE 110 using the CS core network 130 in response to receiving the termination message. In some example, the termination message indicates termination of the first call setup process without requesting the UE 110 to perform retry attempts. The termination message may be an SIP 500 Server Internal Error response or an SIP 503 Service Unavailable response without requesting the UE 110 to make any retry attempts. Also, the service request may be an LTE Extended Service Request.

Additionally or alternatively, the UE 110 may start a timeout timer when sending the measurement report. The UE 110 may send the service request to initiate the second call setup process for setting up the voice call for the UE 110 using the CS core network 130 after the timeout timer reaches a predetermined value. The UE 110 may optionally send a cancellation message to the CSCF controller 172 of the IMS 170 when the timeout timer reaches the predetermined value. In some example, if the UE 110 receives the termination message from the CSCF controller 172 of the IMS 170 before the timeout timer reaches the predetermined value, the UE 110 may also send the service request to initiate the second call setup process in response to receiving the termination message before the timeout timer reaches the predetermined value.

The predetermined value for the timeout timer may range from five seconds to ten seconds. In some examples, the predetermined value for the timeout timer may be set based on network operator's silent redial protection period. In at least one example, the predetermined value for the timeout timer may be set to be equal to or less than the network operator's silent redial protection period. Moreover, the cancellation message send by the UE 110 to the CSCF controller 172 of the IMS 170 may be an SIP CANCEL Request.

In another example, the UE 110 is a terminating terminal that receives an incoming voice call. The UE imitates a first call setup process that attempts to set up a voice call for the UE 110 using the EPC 120 in response to a request from the CSCF controller 172 and the SCC AS 174 of the IMS 170. The request for initiating the call may also be an SIP INVITE Request. Similar to initiating an outgoing voice call, the UE 110 may receive the measurement configuration message from the eNB 128 before or after the initiation of the first call setup process for setting up the incoming voice call. While performing the first call setup process, when one of the set of measurement events specified by the measurement configuration message occurs, the UE 110 sends a measurement report that reports the occurrence of such measurement event, which indicates that the signal quality between the UE 110 and the eNB 128 may not be good enough for successfully setting up a call using the EPC 120.

After sending the measurement report, the UE 110 may wait for a cancellation message from the CSCF controller 172 of the IMS 170 that informs cancellation of the first call setup process. After receiving the cancellation message, the UE 110 may receive a service notification message from the EPC 120 that indicates initiation of a second call setup process for setting up the voice call using the CS core network 130. The UE 110 then may send a service request to initiate the second call setup process for setting up the voice call for the UE 110 using the CS core network 130 in response to receiving the service notification message. In some example, the cancellation message may be an SIP CANCEL Request. Also, the service request may be an LTE Extended Service Request.

The UE 110 includes a transceiver 112 and a call setup controller 114. The transceiver 112 may be configured to communicate with a packet-switched network and/or a circuit-switched network, such as the eNB 128 according to the LTE standards, the NB 148 according to the UMTS standards, and/or the BTS 138 according to the GSM/EDGE/GPRS standards. The call setup controller 114 is configured to perform the first and second call setup processes and manage the changing from performing the first to the second call setup processes as described in the present disclosure.

The UE 110 may also include a processor 116 and a memory 118. The memory 118 may store program instructions, and the processor 116 can execute the program instructions stored in the memory 118 in order to perform various predetermined functions. The processor 116 can include a single or multiple processing cores. Various components of the transceiver 112 and/or the call setup controller 114 may be implemented by hardware components, the processor 116 executing the program instructions, or a combination thereof. Of course, the processor 116 can also execute program instructions to control other operations of the UE 110 that are not discussed in this disclosure.

The memory 118 can be used to store the program instructions, information corresponding to the set of measurement events, measurement results, base stations such as BTS 138, NB 148, and/or eNB 128, and/or intermediate data. In some examples, the memory 118 includes a non-transitory computer readable medium, such as a semiconductor or solid-state memory, a random access memory (RAM), a read-only memory (ROM), a hard disk, an optical disk, or other suitable storage medium. In some embodiments, the memory 118 includes a combination of two or more of the non-transitory computer readable mediums listed above.

Figure 2:
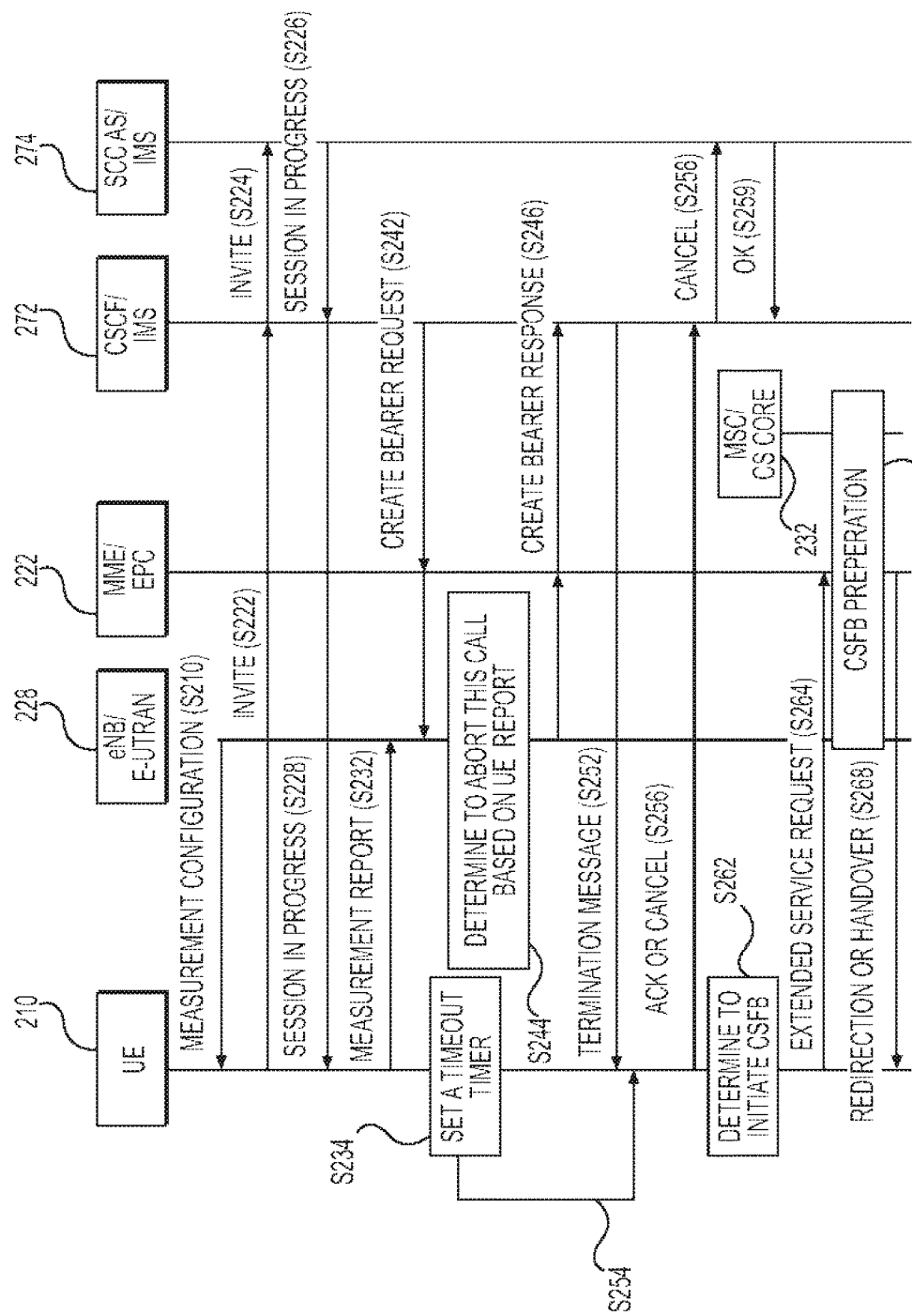
FIG. 2 shows an exemplary signaling diagram of setting up an outgoing call for the user equipment in the communication system in FIG. 1 according to an embodiment of the disclosure.

FIG. 2 shows an exemplary signaling diagram of setting up an outgoing call for a user equipment (UE) 210 in a communication system, such as the UE 110 in the communication system 100 in FIG. 1, according to an embodiment of the disclosure. FIG. 2 shows a signaling sequence among various components, including the UE 210, eNB 228 of an E-UTRAN, MME 222 of an EPC, CSCF controller 272 and SCC AS 274 of an IMS, and MSC 232 of a CS Core network, which may correspond to the UE 110, eNB 128, MME 122, CSCF controller 172, SCC AS 174, and MSC 132 in FIG. 1, respectively. FIG. 2 only highlights example components and messages for illustrating the disclosed embodiments. It is understood that additional messages, requests, or responses may be exchanged among the components depicted in FIG. 2, and additional components of the communication network may also be used for performing the signaling sequence depicted in FIG. 2.

At S210, the eNB 228 sends to the UE 210 a measurement configuration message that specifies a set of measurement events corresponding to poor signal quality between the UE 210 and the packet-switched network, particularly the poor quality between the UE 210 and the eNB 228 that connects the UE 210 to the EPC. The set of measurement events may include the LTE A1, B1, and/or B2 measurement events. Also, the measurement configuration message may be implemented using a LTE Radio Resource Control (RRC) connection reconfiguration message.

At S222, the UE 210 sends a request for initiating a voice call to the CSCF controller 272, such as an SIP INVITE Request. At S224, the CSCF controller 272 forwards the request for initiating the voice call to the SCC AS 274. At S226, the SCC AS 274 sends to the CSCF controller 272 a response indicating that the requested call setup process is in progress, such as an SIP 183 Session in Progress Response. At S228, the CSCF controller 272 may further pass the response indicating that the call setup process is in progress to the UE 210.

Although S210 as depicted in FIG. 2 is performed prior to S222, in some examples, S210 may be performed after S222 or after S228. In some examples, S210 may not be performed after the requested voice call is successfully setup using the packet-switched network.

At S232, when the UE 210 determines that one of the measurement events as specified in the measurement configuration message occurs, the UE 210 sends a measurement report to the eNB 228. Also, at S234, the UE 210 may start a timeout timer when sending the measurement report. A predetermined timeout value for the timeout timer may range from five seconds to ten seconds. In some examples, the predetermined value for the timeout timer may be set based on network operator's silent redial protection period. In at least one example, the predetermined value for the timeout timer may be set to be equal to or less than the network operator's silent redial protection period.

At S242, the CSCF controller 272 may send a request to create a bearer for the voice call. S242 may include the CSCF controller 272 asking a Policy and Charging Rules Function (PCRF) controller to send a session modification message to a Packet Data Network Gateway (P-GW) of the EPC, and the P-GW may pass the request to the MME 222 using an LTE Create Bearer Request. The MME 222 may further send an LTE Bearer Setup Request to the eNB 228. At S244, in response to the LTE Bearer Setup Request, the eNB 228 determines whether to abort the voice call setup process based on the measurement report from the UE 210, the status of the call setup process, or whether the service network support the SRVCC feature, or the like. When the eNB 228 determines to terminate the call setup process for setting up the voice call using the EPC and to initiate another call setup process for setting up the voice call using the CS Core network, at S246 the eNB 228 informs the CSCF controller 272 the decision in a response to the request to create a bearer. S246 may include the eNB 228 sending the determination result to the MME 222 using an LTE Bearer Setup Response. The MME 222 may forward the determination results to the P-GW using a LTE Create Bearer Response, and P-GW may forward the determination result to the CSCF controller 272 via the PCRF controller.

After sending the measurement report at S232, the UE 210 may prepare to terminate the first call setup process and to initiate the second call setup process. In one example, the UE 210 may wait for a termination message from the CSCF controller 272 (S252). The termination message may be an SIP 500 Server Internal Error response or an SIP 503 Service Unavailable response without requesting the UE 110 to make any retry attempts. After the UE 210 receives the termination message, at S256 the UE 210 may send to the CSCF controller 272 an SIP ACK Request that acknowledges the receipt of the termination message.

In some examples, if the timeout timer is used, the UE 210 may wait for the timeout timer reaches the predetermined value or wait for the earlier one of receiving the termination message from the CSCF controller 272 or the timeout timer reaching the predetermined value. When the timeout timer reaches the predetermined value at S254, at S256 the UE 210 may send to the CSCF controller 272 an SIP CANCEL Request that notifies the cancellation of the first call setup process.

At S258, after the CSCF controller 272 receives the SIP ACK Request or the SIP CANCEL Request from the UE 210, the CSCF controller 272 may send an SIP CANCEL Request to SCC AS 274 (S258) to inform the cancellation of setting up the voice call using the EPC, and the SCC AS 274 may reply with an SIP 200 OK Response (S259) to acknowledge the cancellation of setting up the voice call using the EPC.

At S262, based on the timeout timer or the termination message from the CSCF 272, the UE 210 would be able to determine that the first call setup process has been terminated and the second call setup process is to be initiated. At S264, the UE 210 sends via the eNB to the MME 222 a service request to initiate the second call setup process for setting up the voice call for the UE 210 using the CS core network. In some examples, the service request may be an LTE Extended Service Request. At S266, the MME 222, the eNB 228, and the MSC 232 work together to prepare for performing the second call setup process for setting up the voice call for the UE 210. At S268, the MME 222 sends to the UE 210 a redirection message or a handover message with specific information with respect to communicating with the MSC 232. In some examples, the redirection message or a handover message are LTE RRC connection messages.

As described with reference to FIG. 2, the UE 210 may be able to implement the Circuit Switched Fallback (CSFB) functionality when establishing an outgoing voice call based on the signaling even when the service network does not support the SRVCC feature.

Figure 3:
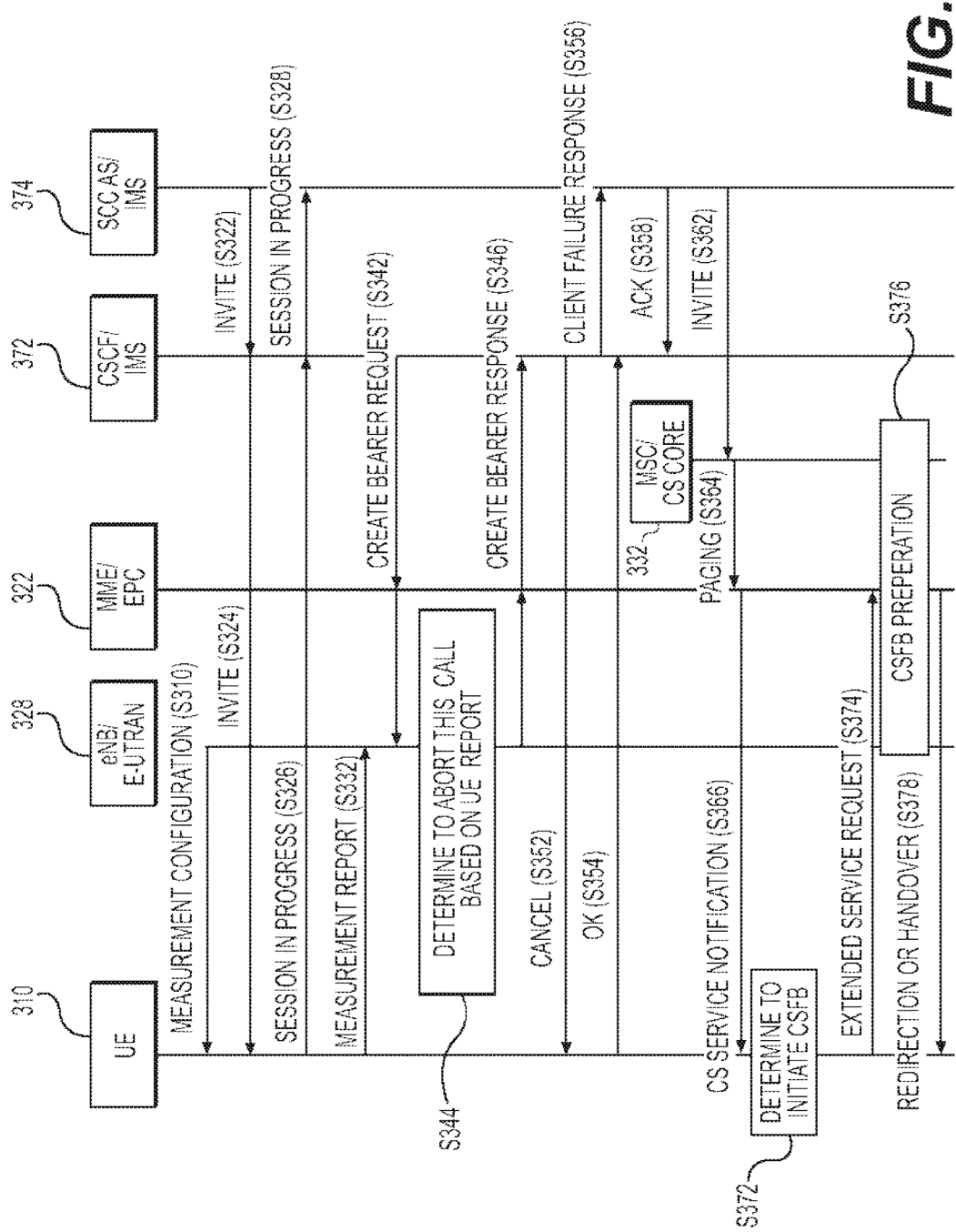
FIG. 3 shows an exemplary signaling diagram of setting up an incoming call for the user equipment in the communication system in FIG. 1 according to an embodiment of the disclosure.

FIG. 3 shows an exemplary signaling diagram of setting up an incoming call for a user equipment (UE) 310 in a communication system, such as the UE 110 in the communication system 100 in FIG. 1, according to an embodiment of the disclosure. FIG. 3 shows a signaling sequence among various components, including the UE 310, eNB 328 of an E-UTRAN, MME 322 of an EPC, CSCF controller 372 and SCC AS 374 of an IMS, and MSC 332 of a CS Core network, which may correspond to the UE 110, eNB 128, MME 122, CSCF controller 172, SCC AS 174, and MSC 132 in FIG. 1, respectively. FIG. 3 only highlights example components and messages for illustrating the disclosed embodiments. It is understood that additional messages, requests, and responses may be exchanged among the components depicted in FIG. 3, and additional components of the communication network may also be used for performing the signaling sequence depicted in FIG. 3.

At S310, the eNB 328 sends to the UE 310 a measurement configuration message that specifies a set of measurement events corresponding to poor signal quality between the UE 310 and the packet-switched network, particularly between the UE 310 and the eNB 328 that connects the UE 310 with the EPC. The set of measurement events may include the LTE A1, B1, and/or B2 measurement events. Also, the measurement configuration message may be implemented using an LTE RRC connection reconfiguration message.

At S322, the SCC AS 374 sends a request for initiating a voice call to the CSCF controller 372. At S324, the CSCF controller 372 forwards the request for initiating the voice call to the UE 310. The request for initiating the voice call may be an SIP INVITE Request. At S326, the UE 310 sends to the CSCF controller 372 a response indicating that the call setup process is in progress, such as using an SIP 183 Session in Progress Response. At S328, the CSCF controller 372 may pass the response indicating that the call setup process is in progress to the SCC AS 374.

Although S310 as depicted in FIG. 3 is performed prior to S324, in some examples, S310 may be performed after S324 or after S326.

At S332, when the UE 310 determines that one of the measurement events as specified in the measurement configuration message occurs, the UE 310 sends a measurement report to the eNB 328. At S342, the CSCF controller 372 may send a request to create a bearer for the voice call in a manner similar to S242 in FIG. 2. At S344, in response to the request to create a bearer, the eNB 328 determines whether to abort the voice call based on the measurement report from the UE 310, the status of the call setup process, or whether the service network support the SRVCC feature, or the like. When the eNB 328 determines to terminate the call setup process for setting up the voice call using the EPC and to initiate another call setup process for setting up the voice call using the CS Core network, at S346 the eNB 328 informs the CSCF controller 372 the decision in a response to the request to create a bearer in a manner similar to S246 in FIG. 2.

At S352, after receiving the response to the request to create a bearer, the CSCF controller 372 sends a cancellation message to the UE 310 to cancel the first call setup process. The cancellation message may be an SIP CANCEL Request. At S354, the UE 310 may send to the CSCF controller 372 an SIP 200 OK Response that indicates the acknowledgement of the cancellation message. At S356, the CSCF controller 372 may also send to the SCC AS 374 a failure response indicating that the incoming voice call will not be setup using the EPC. In some examples, the failure response may be one of the SIP four hundred series Client Failure Response. At S358, upon receiving the failure response, the SCC AS 374 may send the CSCF controller 372 an SIP ACK Request that acknowledges the cancellation of the first call setup process.

At S362, the SCC AS 374 may further send to the CSCF controller 372 another request for initiating a voice call using the MSC 332 of the CS Core network, and the CSCF controller 372 may forward the request to the MSC 332. At S364, the MSC 332 sends a paging message to the MME 322 that indicates that the voice call will be setup using the MSC 332. At S366, the MME 322 sends to the UE 310 a service notification message that indicates initiation of the second call setup process for setting up the voice call using the MSC 332.

At S372, in response to the service notification message, the UE 310 would be able to determine that the first call setup process has been terminated and the second call setup process is to be initiated. At S374, the UE 310 sends via the eNB to the MME 372 a service request to initiate the second call setup process for setting up the voice call for the UE 310 using the CS core network. In some examples, the service request may be an LTE Extended Service Request. At S376, the MME 322, the eNB 328, and the MSC 332 work together to prepare for performing the second call setup process for setting up the voice call for the UE 310. At S378, the MME 322 sends to the UE 310 a redirection message or a handover message with specific information with respect to communicating with the MSC 332. In some examples, the redirection message or a handover message are LTE RRC connection messages.

As described with reference to FIG. 3, the UE 310 may be able to implement the Circuit Switched Fallback (CSFB) functionality when establishing an incoming voice call based on the signaling even when the service network does not support the SRVCC feature.

Figure 4:
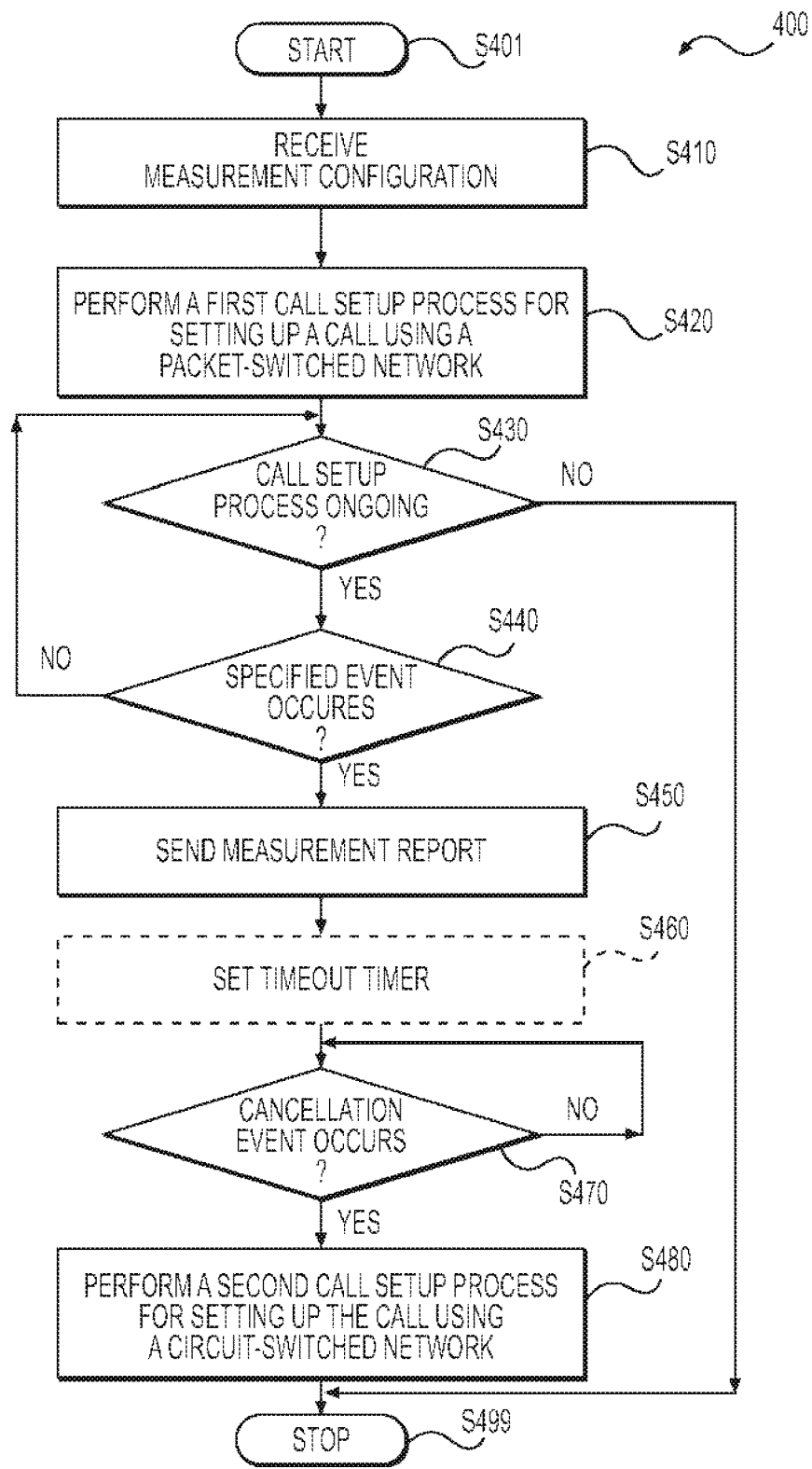
FIG. 4 shows a flow chart outlining an exemplary process for changing from performing a first call setup process to a second call setup process in order to setup a voice call for a user equipment, such as the user equipment in FIG. 1, according to an embodiment of the disclosure.

FIG. 4 shows a flow chart outlining an exemplary process 400 for changing from a first call setup process to a second call setup process in order to setup a voice call for a user equipment, such as the UE 110 in FIG. 1, according to an embodiment of the disclosure. It is understood that additional operations may be performed before, during, and/or after the process 400 depicted in FIG. 4. The process 400 starts at S401 and proceeds to S410.

At S410, a measurement configuration message is received by a UE. The measurement configuration message specifies a set of measurement events corresponding to poor signal quality between the UE and a packet-switched network, and particularly between the US and an eNB that connects the UE to the packet-switched network. In some examples, S410 corresponds to S210 in FIG. 2 or S310 in FIG. 3.

At S420, the first call setup process for setting up the voice call for the UE using the packet-switched network is performed. In some examples, S410 corresponds to S222-S228 and S242-S246 in FIG. 2 or S322-S328 and S342-S344 in FIG. 3.

At S430, it is determined whether the first call setup process is still ongoing. If the first call setup process is still ongoing, the process proceeds to S440. If the first call setup process is completed or aborted entirely, the process moves to S499 and terminates.

At S440, it is determined whether one of the measurement events specified in the measurement configuration message has occurred. If one of the measurement events specified in the measurement configuration message occurs, the process proceeds to S450; otherwise, the process proceeds to S430 to monitor the first call setup process as well as S440 to monitor the measurement events.

At S450, a measurement report indicating that one of the measurement events specified in the measurement configuration message has occurred is sent. In some examples, S450 corresponds to S232 in FIG. 2 or S332 in FIG. 3.

At S460, a timeout timer is setup. In some examples, S460 can be optional and may correspond to S234 in FIG. 2.

At S470, it is determined whether a cancellation event occurs. If it is determined that a cancellation event occurs, the process proceeds to S480. If it is determined that a cancellation event has not occurred, the process stays at S470. In some examples, the cancellation event may be receiving a termination message from the service network, such as S252 in FIG. 2. In some examples, the cancellation event may be the timeout timer setup at S460 reaches a predetermined value, such as S254 in FIG. 2. In some examples, the cancellation event may be receiving a cancellation message followed by a service notification message from the service network, such as S352 and S366 in FIG. 3.

At S480, a second call setup process for setting up the voice call for the UE using a circuit-switched network is performed. In some examples, S480 corresponds to S264-S268 in FIG. 2 or S374-S378 in FIG. 3.

After S480 or S430, the process 400 proceeds to S499 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for setting up a call for a user equipment, comprising:
   receiving, by the user equipment, a measurement configuration message that specifies a set of measurement events corresponding to poor signal quality between the user equipment and a packet-switched network;
   initiating, by the user equipment, a first call setup process for setting up the call using the packet-switched network;
   sending, by the user equipment, a measurement report when one of the set of measurement events occurs while performing the first call setup process;
   receiving a termination message, the termination message indicating termination of the first call setup process without requesting the user equipment to perform retry attempts; and
   sending, by the user equipment in response to receiving the termination message, a service request to begin a second call setup process for setting up the call for the user equipment using a circuit-switched network.

2. The method according to claim 1, wherein the set of measurement events comprises at least one of:
   a first event where a signal strength from a base station that communicatively connects the user equipment and the packet-switched network becomes less than a first threshold;
   a second event where a signal strength from a neighboring base station becomes better than a second threshold; and
   a third event that is a combination of at least the first event and the second event.

3. The method according to claim 1, further comprising:
   receiving the termination message after sending the measurement report.

4. The method according to claim 1, further comprising:
   starting a timeout timer when sending the measurement report; and
   sending the service request after the timeout timer reaches a predetermined value.

5. The method according to claim 1, further comprising:
   receiving, by the user equipment from the packet-switched network in response to the sent service request, a redirection message or a handover message specifying a controller of the circuit-switched network.

6. The method according to claim 1, further comprising:
sending, by the user equipment in response to receiving the termination message and before sending the service request, an acknowledgement message indicating the receipt of the termination message.

7. The method according to claim 1, further comprising:
sending, by a base station that communicatively connects the user equipment and the packet-switched network, the measurement configuration message to the user equipment;
receiving, by the base station, the measurement report from the user equipment; and
determining whether to terminate the first call setup process and to begin the second call setup process based on at least the measurement report from the user equipment and call status of the user equipment.

8. The method according to claim 7, further comprising:
receiving, by the base station, a create bearer request from an Internet Protocol Multimedia Subsystem (IMS); and
sending, by the base station to the IMS in response to the create bearer request, a create bearer response that indicates a determination result of whether to terminate the first call setup process and to begin the second call setup process.

9. A user equipment, comprising:
a transceiver configured to communicate with a packet-switched network and a circuit-switched network; and
a controller configured to:
   receive, through the transceiver, a measurement configuration message that specifies a set of measurement events corresponding to poor signal quality between the user equipment and the packet-switched network;
   initiate a first call setup process for setting up a call for the user equipment using the packet-switched network;
   send, through the transceiver, a measurement report when one of the set of measurement events occurs while performing the first call setup process;
   receive, through the transceiver, a termination message, the termination message indicating termination of the first call setup process without requesting the user equipment to perform retry attempts; and
   send, through the transceiver in response to receiving the termination message, a service request to begin a second call setup process for setting up the call for the user equipment using the circuit-switched network.

10. The user equipment according to claim 9, wherein the set of measurement events comprises at least one of:
a first event where a signal strength from a base station that communicatively connects the user equipment and the packet-switched network becomes less than a first threshold;
a second event where a signal strength from a neighboring base station becomes better than a second threshold; and
a third event that is a combination of at least the first event and the second event.

11. The user equipment according to claim 9, wherein the controller is further configured to:
receive the termination message after sending the measurement report.

12. The user equipment according to claim 9, wherein the controller is further configured to:
start a timeout timer when sending the measurement report; and
send the service request after the timeout timer reaches a predetermined value.

13. The user equipment according to claim 9, wherein the controller is further configured to:
receive, from the packet-switched network in response to the sent service request, a redirection message or a handover message specifying a controller of the circuit-switched network.

14. The user equipment according to claim 9, wherein the controller is further configured to:
send, in response to receiving the termination message and before sending the service request, an acknowledgement message indicating the receipt of the termination message.

15. A communication system, comprising:
a service network; and
a user equipment configured to communicate with the service network, wherein
the service network is configured to send a measurement configuration message that specifies a set of measurement events corresponding to poor signal quality between the user equipment and a packet-switched network of the service network;
the user equipment is configured to:
   receive the measurement configuration message;
   initiate a first call setup process for setting up a call for the user equipment using the packet-switched network
   send a measurement report when one of the set of measurement events occurs while performing the first call set-up process;
   receive a termination message, the termination message indicating termination of the first call setup process without requesting the user equipment to perform retry attempts; and
   send, in response to receiving the termination message, a service request to begin a second call setup process for setting up the call for the user equipment using a circuit-switched network after terminating the first call setup process.

16. The communication system according to claim 15, wherein the set of measurement events comprises at least one of:
a first event where a signal strength from a base station that communicatively connects the user equipment and the packet-switched network becomes less than a first threshold;
a second event where a signal strength from a neighboring base station becomes better than a second threshold; and
a third event that is a combination of at least the first event and the second event.

17. The communication system according to claim 15, wherein
the user equipment is further configured to:
   receive the termination message after sending the measurement report, and the service network is further configured to:
   receive the measurement report from the user equipment;
   determining whether to terminate the first call setup process and to begin the second call setup process based on at least the measurement report from the user equipment and call status of the user equipment; and send the termination message indicating termination of the first call setup process to the user equipment when the first call setup process is determined to be terminated.

18. The communication system according to claim 15, wherein
the user equipment is further configured to:
start a timeout timer when sending the measurement report; and
send the service request after the timeout timer reaches a predetermined value.

19. The communication system according to claim 15, wherein the service network is further configured to:
send, in response to the service request from the user equipment, a redirection message or a handover message specifying a controller of the circuit-switched network to the user equipment.

20. The communication system according to claim 15, wherein the service network comprises:
an Internet Protocol Multimedia Subsystem (IMS); and
a base station that is configured to receive a create bearer request from the IMS, and send a create bearer response that indicates a determination result of whether to terminate the first call setup process and to begin the second call setup process to the IMS in response to the create bearer request.

* * * * *